Figure 1:
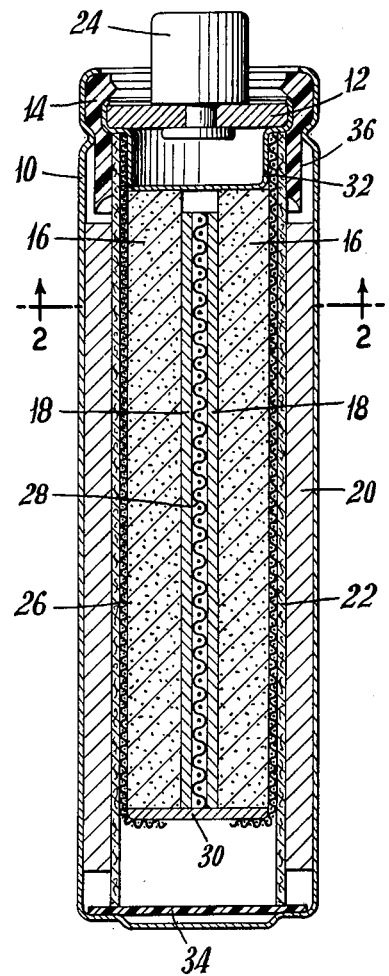

April 18, 1961  J. L. S. DALEY  2,980,747
SEALED NICKEL CADMIUM CELL
Filed Aug. 10, 1959

INVENTOR.
JOHN L. S. DALEY
BY
ATTORNEY

2,980,747

SEALED NICKEL CADMIUM CELL

John L. S. Daley, Bay Village, Ohio, assignor to Union Carbide Corporation, a corporation of New York Filed Aug. 10, 1959, Ser. No. 832,556

5 Claims. (Cl. 136—6)

This invention relates to an improved construction of a sealed nickel cadmium secondary cell. More particularly, the invention relates to an improvement in the physical structure and location of an anti-polar mass which is incorporated within the cell to prevent the generation of hydrogen gas in the event of polarity reversal of the cell.

A major difficulty encountered in the manufacture of series-connected, sealed, rechargeable nickel cadmium batteries is that although each individual cell in a battery may contain equal quantities of active materials they will generally charge and maintain a charge with varying efficiency. As a result, the individual cells will reach complete discharge at different times. The electrodes of the first cell to be discharged completely will reverse in polarity, and be driven in reverse by other cells, since the battery as a unit will continue to discharge.

Polarity reversal of an individual cell in a series-connected battery is very undesirable. Upon further discharge flow of battery current, hydrogen or oxygen or both are soon generated at the positive and negative electrodes respectively of the cell whose polarity is reversed. This generation of gas produces a risk of an explosive mixture of hydrogen and oxygen forming and, in any event in sealed cells, the casing may swell and eventually may explode.

It is now known in the art that the generation of hydrogen gas within a sealed nickel cadmium cell upon polarity reversal may be prohibited by employing a so-called "anti-polar" mass. A suitable anti-polar mass is a cathodic reducible oxide, such as cadmium oxide or cadmium hydroxide, added integrally to the positive electrode. In operation, the cathodic reducible oxide is reduced at a potential lower than is required to generate hydrogen gas, and as long as a sufficient quantity of a reducible oxide is present within the positive electrode, the generation of hydrogen gas during cell reversal is prevented. In practice, the negative electrode is of such capacity and is in such a charge state that it will evolve oxygen very shortly after cell reversal occurs, thus insuring a constant supply of oxygen to react with the anti-polar mass as rapidly as it is electrochemically reduced, thereby insuring against the complete reduction of the anti-polar mass.

The principal object of the invention is to provide an improved physical construction of a sealed nickel cadmium secondary cell of the type employing an anti-polar mass.

A concurrent object of the invention is to position an efficient anti-polar mass in a sealed nickel cadmium secondary cell with the minimum sacrifice of space within tthe cell and without disturbing the electro-chemical structure of the cell.

Broadly stated, the objects of the invention are accomplished by incorporating an anti-polar mass within a nickel cadmium cell in the form of two auxiliary electrodes of a cathodic reducible oxide, such as cadmium oxide or preferably cadmium hydroxide, separated by a spacer screen of sufficient thickness and of proper structure to allow gas circulation therebetween; all of which are disposed between two semi-cylindrical pieces of nickel hydroxide mix which make up the positive electrode. This construction provides an easy access to the anti-polar mass for the oxygen gas which will evolve at the negative electrode upon polarity reversal. More specifically, in the event the cell reverses polarity the cadmium hydroxide auxiliary electrodes will be partially reduced to cadmium metal, and no hydrogen gas will be generated at the positive electrode. Simultaneously, by provision of the spacer screen, the oxygen gas evolving from the negative electrode will collect within the space provided by the screen and react directly with the exposed surfaces of the reduced auxiliary electrodes and once again oxidize the cadmium metal; the oxygen being evolved and absorbed at a steady rate before excessive pressure is produced within the cell.

Figure 2:
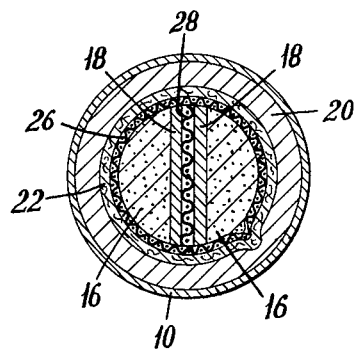

The invention will be more readily understood by reference to the accompanying drawings, wherein:

Fig. 1 is a vertical section of the preferred embodiment of a sealed nickel cadmium rechargeable cell embodying the principles of the invention; and Fig. 2 is a view taken along the line 2—2 of Fig. 1.

The illustrated cell is a cell assembled according to the method set forth in my copending application "Method of Constructing Nickel Cadmium Cells," U.S. Serial No. 832,616, filed concurrently herewith. However, the improvements taught by the subject invention apply equally to all nickel cadmium cells independent of the assembly method employed.

Referring now to the drawing, a sealed nickel cadmium cell embodying the invention comprises a container 10, a container cover 12, both suitably of nickel or nickel plated steel, a seal gasket 14 of a hard nylon composition interposed between the container 10 and container cover 12, a positive nickel electrode 16 made up of two semi-cylindrically shaped pieces between which auxiliary negative cadmium electrodes 18 are located, a negative cadmium electrode 20, and a separator 22 interposed between the positive electrode 16 and the negative electrode 20. The positively charged container cover 12 is fitted with an external positive terminal 24, and the cell container 10 has an insulating member 34 disposed internally across its bottom.

The individual pieces which make up the positive electrode 16 may suitably be molded from an electrolyte-moist powdered mixture of nickel hydroxide and natural flake graphite powders, the latter providing an electrically conductive matrix within the pieces. The pieces are molded in a fully discharged state. The auxiliary negative electrodes 18, are separated by a spacer screen 28 and are interposed between the two pieces of the positive electrode 16. The spacer screen 28 separating the auxiliary electrodes 18, is preferably a nickel screen, although a corrugated or expanded nickel sheet is suitable, and is of sufficient thickness to provide a gas access for the evolved oxygen between the auxiliary electrodes 18. The assembly of the positive electrode 16 and the auxiliary electrodes 18 unit is contained within a fine mesh nickel screen tube 26 which serve as both a current collector and a container. The tube 26 is provided with a nickel or nickel plated steel disc 30, which is secured across the bottom of the tube 26, as by welding. A generally cup-shaped nickel or nickel plated steel cap 32, the upper portion of which is stepped out to receive the container cover 12, is secured to the top of the tube 26, preferably by welding, and forms part of the seal closure of the cell, thereby providing a continuous surface of nickel or nickel plated steel below the cell container cover 12.

The auxiliary negative electrodes 18 and the negative electrode 20 are sintered nickel plaques impregnated with cadmium, cadmium oxide, or preferably cadmium hydroxide. Preferably, both the auxiliary electrodes 18 and the negative electrode 20 are in the fully discharged state when the cell is assembled.

A separator 22, comprising one or more layers of a thin cloth-like material stable in the electrolyte and preferably nylon, is interposed between the electrode container tube 26 and the negative electrode 20.

The novel construction of the nickel cadmium cell of the invention gives rise to many advantages. The employment of a spacer screen or sheet between the two auxiliary electrodes embodying the anti-polar mass provides an easy access to the auxiliary electrodes for the oxygen gas that is generated at the negative electrode upon polarity reversal. This is accomplished without disturbing the electro-chemical structure of the cell and with the minimum sacrifice of space within the cell. Moreover, the excellent access permits the use of less active material in the auxiliary electrodes than has heretofore been possible. The placing of the auxiliary electrodes within the positive electrode also provides excellent electrical contact between the two without any welding or special connection being necessary.

I claim:

1. In a sealed nickel cadmium secondary cell of the type employing an anti-polar mass of a cathodic reducible oxide and which comprises a container, a cover for said container, a seal gasket interposed therebetween, a negative cadmium electrode, a positive nickel electrode, a separator interposed therebetween, and an alkaline electrolyte throughout; the improvement which comprises said positive electrode consisting of two semi-cylindrical pieces and said anti-polar mass of a cathodic reducible oxide being in the form of auxiliary negative electrodes which are separated by a spacer screen or sheet and are located in said cell between and in juxtaposition with the flat surfaces of said semi-cylindrical pieces of said positive electrode.

2. In a sealed nickel cadmium secondary cell of the type employing an anti-polar mass of a cathodic reducible oxide and which comprises a container, a cover for said container, a seal gasket interposed therebetween, a negative electrode comprising a sintered nickel plaque containing within its pores a material chosen from the group consisting of cadmium, cadmium oxide and cadmium hydroxide, a positive electrode molded from a mixture which comprises nickel hydroxide, natural flaked graphite powders and potassium hydroxide, a separator between said positive electrode and said negative electrode, and potassium hydroxide electrolyte throughout; the improvement which comprises said positive electrode consisting of two semi-cylindrical pieces and said anti-polar mass of a cathodic reducible oxide being in the form of auxiliary negative electrodes comprising sintered nickel plaques containing within its pores a material chosen from the group consisting of cadmium oxide and cadmium hydroxide which are separated by a spacer screen or sheet and are located in said cell between and in juxtaposition with the flat surfaces of said semi-cylindrical pieces of said positive electrode.

3. The nickel cadmium cell of claim 2 wherein said positive electrode and said negative electrode are so electrochemically balanced that said negative electrode will reach full discharge and evolve oxygen within a short time after the reduction of said anti-polar mass of a cathodic reducible oxide commences.

4. In a sealed nickel cadmium secondary cell of the type employing an anti-polar mass of a cathodic reducible oxide and which comprises a container, a cover for said container, a seal gasket of a hard nylon composition interposed therebetween, a negative electrode comprising a sintered nickel plaque containing within its pores cadmium hydroxide, a positive electrode molded from a mixture which comprises nickel hydroxide, natural flaked graphite powders and potassium hydroxide, a nylon separator between said positive electrode and said negative electrode, and potassium hydroxide electrolyte throughout; the improvement which comprises said positive electrode consisting of two semi-cylindrical pieces and said anti-polar mass of a cathodic reducible oxide being in the form of auxiliary negative electrodes comprising sintered nickel plaques containing within its pores cadmium hydroxide, which are separated by a nickel spacer screen or sheet and are located in said cell between and in juxtaposition with the flat surfaces of said semi-cylindrical pieces of said positive electrode; said semi-cylindrical pieces of said positive electrode being enclosed in a fine mesh nickel tube, said tube interposed between said positive electrode and said separator and closed at the bottom by a disc having a nickel surface and at the top by a cup-shaped member having a nickel surface which is in contact with said cell cover.

5. The nickel cadmium cell of claim 4 wherein said positive electrode and said negative electrode are so electrochemically balanced that said negative electrode will reach full discharge and evolve oxygen within a short time after the reduction of said anti-polar mass of cathodic reducible oxide commences.

References Cited in the file of this patent

UNITED STATES PATENTS

| | | |
|---|---|---|
| 2,608,595 | Conklin | Aug. 26, 1952 |
| 2,636,058 | Neumann | Apr. 21, 1953 |

FOREIGN PATENTS

| | | |
|---|---|---|
| 165,982 | Australia | Nov. 14, 1955 |
| 741,345 | Great Britain | Nov. 30, 1955 |